United States Patent [19]

Flood

[11] Patent Number: 4,489,116

[45] Date of Patent: Dec. 18, 1984

[54] SKIN PACKAGING TECHNIQUE PROVIDING PAINT MASKING

[76] Inventor: James R. Flood, 25550 Merle St., Edwardsburgh, Mich. 49112

[21] Appl. No.: 451,949

[22] Filed: Dec. 21, 1982

[51] Int. Cl.[3] .......................... B32B 3/24; B65B 53/02

[52] U.S. Cl. ...................................... 428/138; 53/428; 53/442; 53/509; 206/497; 427/282; 427/421; 428/174

[58] Field of Search ................. 53/427, 441, 509, 428, 53/431, 442, 557; 118/505; 428/138, 174; 206/497, 328, 332, 524.1, 524.6; 427/282, 421

[56] References Cited

U.S. PATENT DOCUMENTS 3,267,633 8/1966 Goodman ............................ 53/427

3,358,829 12/1967 Smith et al. .......................... 53/427

3,532,214 10/1970 Helms ................................ 206/497

FOREIGN PATENT DOCUMENTS 593969 2/1978 U.S.S.R. ................................ 53/509

*Primary Examiner*—Paul J. Thibodeau

*Attorney, Agent, or Firm*—Larry J. Palguta; John A. Young

[57] ABSTRACT

Articles (16, 18) are shrink mounted onto a stiff carrier or backing (10) and simultaneously selectively masked for paint spraying of the interiors of the articles (16, 18). The articles (16, 18) are secured to the backing (10) by a thin gauge plastic film (20) drawn under heat to shrink its dimensions while a vacuumizing head (50, 51) forms portions of the film to effect masking of selected edges (26, 28, 29) of the articles (16, 18). The interiors of the articles may be spray painted through openings (30, 31) in the backing (10), with the masked edges (17, 19, 26, 28, 29) of the articles (16, 18) protected from the paint (38).

9 Claims, 8 Drawing Figures

SKIN PACKAGING TECHNIQUE PROVIDING PAINT MASKING

DESCRIPTION

TECHNICAL FIELD

Articles can be shrink mounted onto carriers by enclosing the article within a thin plastic material, bonding the periphery of the thin plastic material to the carrier backing, and then shrinking the plastic to firmly cover the article and retain the article against the backing.

BACKGROUND ART

It is well known to utilize heat shrinkable plastic film material which is flexible and conformable with the irregular outline of an article. The plastic heat shrinkable material is then drawn under heat to shrink its dimensions and thereby secure the article to a carrier backing. However, the prior art has lacked any means for utilizing such principle in combination with painting the interior of the article wherein the carrier and plastic material are used effectively for masking selected portions of the exterior and interior of the article during painting of the interior.

DISCLOSURE OF THE INVENTION

The present invention utilizes a thin film of heat shrinkable plastic material to effect a bonding of an article to a stiff carrier or backing. During the vacuumizing step when the hot film is caused to conform to the surface of the article, the plastic material will shrink and be utilized to mask certain portions of the plastic article so that during painting of the interior of the article, the exterior surfaces of the article are masked from paint coverage, and selected edges of a recessed portion of a through opening of the article are masked by the carrier or backing.

An opening in the carrier provides access for painting the interior of the article while it is mounted onto the carrier. After the shrink fitting has been completed, the film is heated and the edges of the film become bonded to the carrier. An important feature of the present invention lies in multiple utilization of both the thin film heat shrinkable plastic material which masks the article, and also the use of the backing which serves as a mask for at least the edge of the recess in an opening in the article confronting the backing. These functions are in addition to the usual functions of the film and backing.

Another important feature of the present invention is that the painting of the interior of the article can occur through a cut out access opening in the backing which in no way weakens the backing and enables shipment of the article on the backing just as adequately as in previous applications. Painting occurs more efficiently because of the unique and highly specialized nature of masking the article against inadvertent coating by paint spraying into the interior of the article.

An article which contains electrically sensitive components and which must be masked against stray exterior signals can be readily shielded by means of spray coating the interior to form a continuous electrically conductive coating, the coating having been applied only to selected areas of the interior of the article. Masking of selected surfaces of the interior of the article is enabled by the plastic material which, during the vacuumizing step, is drawn into the interior to effect such masking.

An important feature of the present invention is the utilization of a vacuumizing head which causes the flexible plastic film material, prior to heat shrinking, to enter selected openings of the article to serve a masking function for interior edges of the openings. The plastic hardens in its masking positions, and the article can then be readily paint sprayed after it is mounted onto the backing. All of this contributes to reduction in handling procedure, and a substantial saving in the overall operation of producing articles such as medical instruments which require spray coating of the instrument interiors to render them less susceptible to electrical disturbance caused by exterior EMI signals.

BEST MODE FOR CARRYING OUT THE INVENTION

Figure 1:
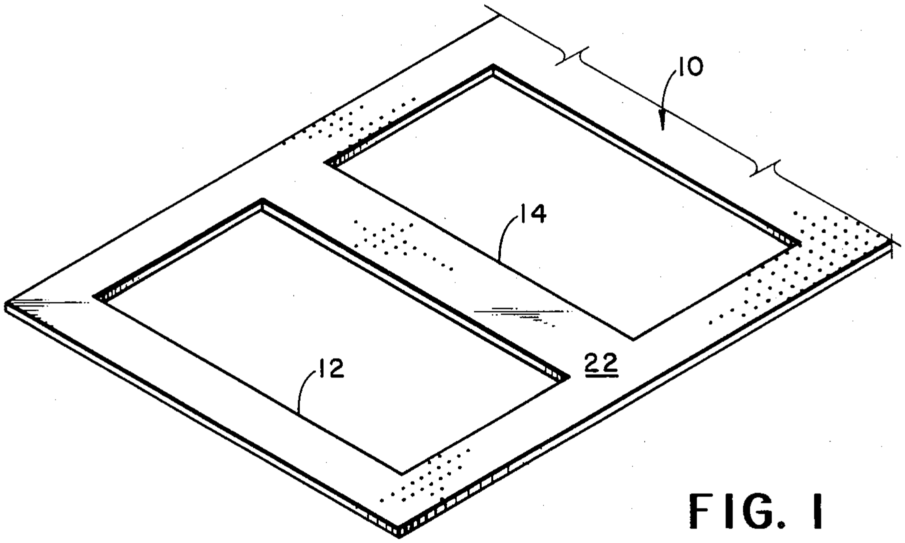
FIG. 1 is an isometric fragmentary view of a backing having openings constructed therein in preparation for receiving articles to be paint sprayed.

Referring now to the drawings, there is illustrated a cardboard backing designated generally by reference numeral 10, the backing being perforated with numerous fine openings in order that the vacuum can be exerted through the thickness of the cardboard backing. The cardboard backing has a number of milled out openings such as 12 and 14. It should be understood that the cardboard backing as illustrated can vary considerably in length and width and correspondingly the distribution of openings such as 12 and 14 varies. Thus, the illustration of two openings in the backing is to be understood only as illustrative of the invention. Also, the numerous fine openings may be present in the form of a porous material, it being well-known in the art that porous or permeable materials are utilized in heat shrinking processes.

After the backing (FIG. 1) is formed, there is surmounted over the openings, articles 16 and 18. Merely for purposes of description, these may be electronic instrument device shells typically formed in two halves with electrical components to be mounted within the interior of the housing sections. The interior or recessed portion is typically painted with a material which will shield the sensitive electrical components. The electrical components are shielded against EMI signals by a continuous coating of electrically conductive material such as nickel acrylic. The particular shielding composition is not a critical feature of the present invention, but may be "Ceriton", a paint provided by DuPont and consisting of a metal such as nickel and a binder, typically an acrylic material. It is important that the entire interior of the shell be coated with this material to provide an effective shield against external EMI signals.

Heretofore, the painting of these shells occurred before mounting on the backing which served merely as the means for shipping the articles. In the present invention, however, the backing 10 serves also to mask certain selected portions of the housing so that during paint spraying of the electrically conductive material into the interior of the shell, selected areas of the shell are shielded from the paint by the backing. Also novel to the invention is that the paint spraying occurs after fixing the articles to the cardboard backing 10.

Figure 2:
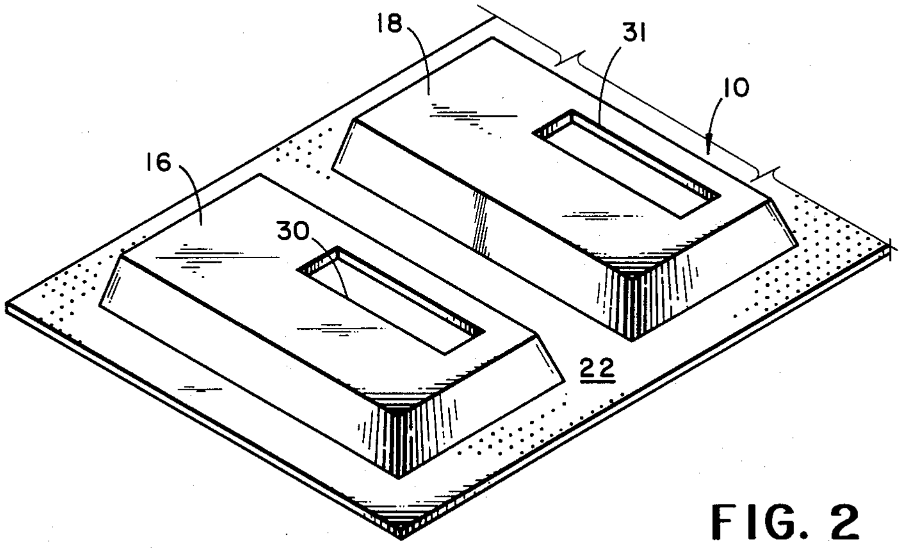
FIG. 2 illustrates the articles mounted on the backing in a manner surmounting the openings illustrated FIG. 1.
Figure 3:
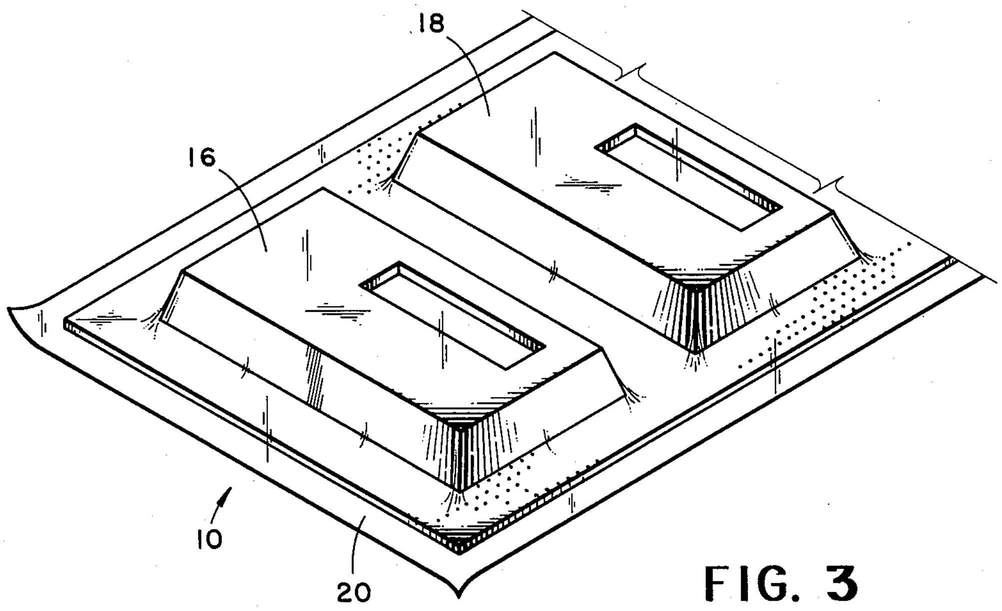
FIG. 3 illustrates the articles after being covered by a thin flexible heat sensitive plastic material suitable for the present invention.
Figure 4:
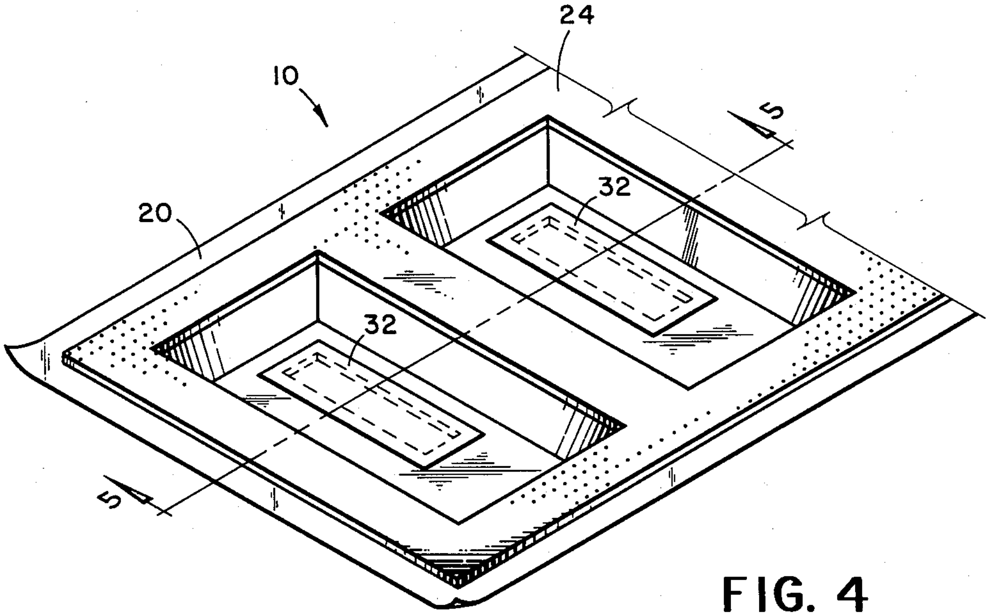
FIG. 4 illustrates the undersurfaces and recessed portions of the articles shown in FIG. 3 and after shrinkage and joinder between the plastic shrinkage material and the articles has been completed, and with the periphery of the plastic article joined to the backing.

The thin gauge plastic film 20 is caused to overlay the exterior surfaces of the articles 16, 18 in the manner illustrated in FIG. 3. The surface 22 (see FIGS. 1, 2) of the cardboard mounting is treated so that the heated plastic material engages surface 22 of backing 10 and adheres to that surface, producing a fused bond which is difficult to strip away and capable of retaining articles 16, 18 against the backing 10.

Figure 5:
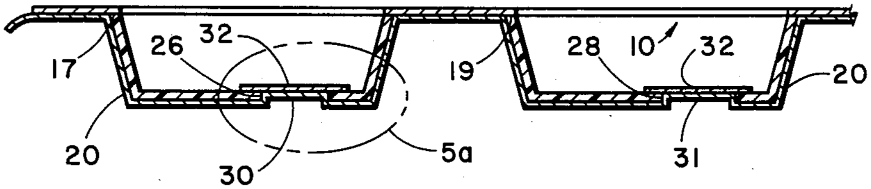
FIG. 5 is a cross-sectional view along view line 5—5 of FIG. 4 and illustrates the masking of the edges of recessed portions of the articles.
Figure 5A:
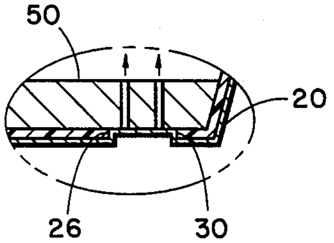
FIG. 5A illustrates deformation of the thin film plastic material as it enters a through opening in the article during vacuumizing and then shrinkage.
Figure 6:
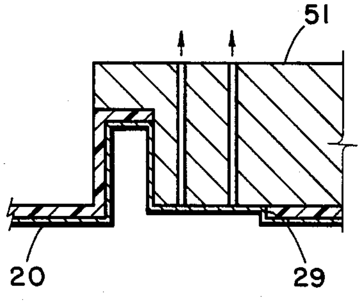
FIG. 6 illustrates an irregular shaped opening and how the vacuumizing head exerts vacuum at selected areas of the article in order to induce entry of the plastic film into the opening to mask the edges before paint spraying.

The thin plastic film 20 is readily shapable and strongly adheres to the exterior surface of the articles 16, 18, and will conform to the irregular external surfaces of the article. The shaping of the plastic film occurs by placing a contoured vacuumizing head against the surface of the cardboard and into the interior of the article. When vacuum is developed at surface 24 of backing 10, it causes the plastic film 20 to adhere to surface 22 (FIGS. 1,2). The vacuum will further cause the described shaping of the plastic film so that it conforms closely to the contours of the articles 16, 18. It is important to note that the peripheral edges 17, 19 of the open ends of recessed portions of articles 16, 18, extend beyond the perimeters of the openings 12 and 14 so that none of the article edges confronting surface 22 of the backing 10 are exposed to paint spray when the paint spraying occurs in the manner shown in FIG. 7. Moreover, the vacuumizing step has the effect of drawing a portion of the film toward the interior of the articles 16, 18, thus causing any article through opening edges 26, 28 to become shielded by the thin gauge plastic shrink material. As shown in FIGS. 5, 5A and 6, the plastic material is drawn upwardly into the through openings 30, 31 to mask the edges of those openings against any paint of the spray (FIG. 7) which develops the interior coating. Shields 32 also protect other interior portions of the articles.

As shown in FIGS. 5A and 6, when a series of membrane switches or the like are to be contained in the articles, the edges 26, 29 must be carefully masked to prevent shorting. The plastic film material is drawn into each through opening or can be drawn upwardly against stepped portions of the interior of the article in the manner illustrated in FIG. 6, all of which contributes to the shielding function. Additionally, shield 32 is used to surround the interior of the switch openings.

In brief, the vacuumizing step can be used for drawing the thin plastic shapable material into openings, stepped portions, struck portions, or the like, all of which are necessary to provide masking prior to the coating step.

This is accomplished as illustrated in FIGS. 5*a* and 6 by selectively contouring the vacuumizing heads 50 and 51 and developing vacuum at a particular portions where it is desired to draw the plastic material.

Figure 7:
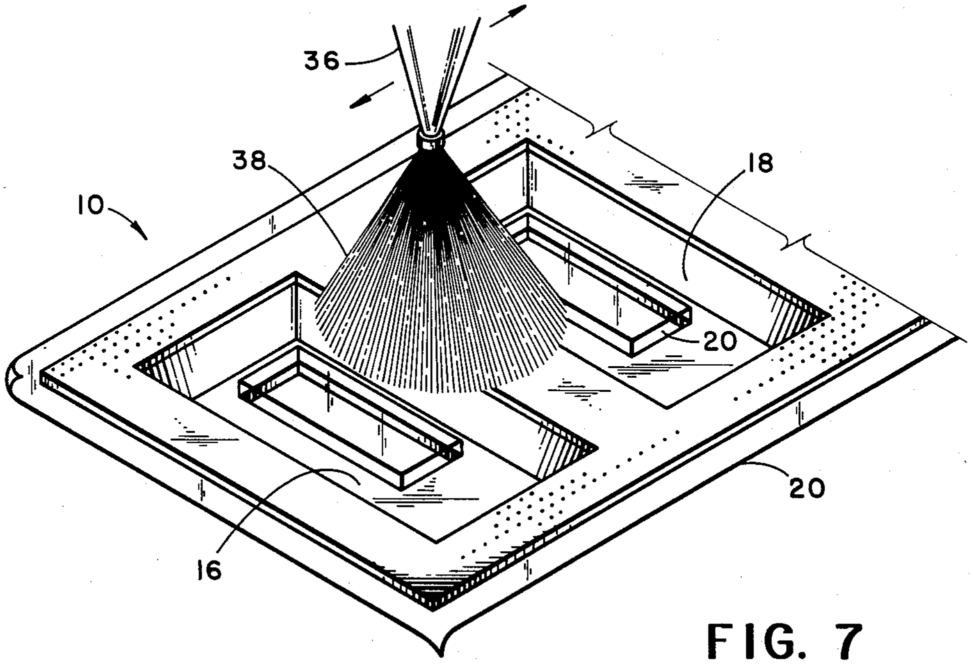
FIG. 7 illustrates the paint spraying step.

As shown in FIG. 7, after the shaping and masking are complete, spray nozzle 36 emits a spray 38 of electrically conductive coating which competely covers all unmasked portions of the interior of the articles 16, 18, the exterior portions of the articles being, of course, shielded by the plastic film as shown in FIG. 3, the interiors protected at the peripheral edges 17, 19 of the recessed portions of the openings confronting cardboard backing 10, and edges 26, 28 protected by the plastic material drawn into through openings 30, 31 by the vacuumizing step. After the coating is completed, the interiors are well protected against any EMI interference by reason of the shielding. It is important that the coating be void free, although it can vary in thickness.

OPERATION

In operation, a perforated or permeable backing 10 of selected configuration has openings 12 and 14 which are milled in the backing.

Next, articles 16, 18 intended to be paint sprayed, are mounted on the backing 10 and surmount the openings 12 and 14. The outer edges 17, 19 of reccessed portions through openings in the articles confront the backing 10 and are shielded. Next, a heated thin film plastic material of well known composition is used to shrink fit the articles 16, 18 and film 20 against the backing 10 by first heating the film and causing the film 20 to adhere to the pretreated surface 22 of the backing. Vacuumizing is applied to surface 24 of backing 10 with vacuum applied at selected locations of the interior of the articles to cause the film 20 to enter through openings 30, 31, struck portions, or the like and thus shield such openings in the manner illustrated in FIG. 5, 5A and 6.

Next, after the shrink fitting is completed in the manner described, the interior is spray coated as illustrated in FIG. 7. A spray 38 of electrically conductive material produces a void free shielding for the interior of the articles 16 and 18. The interiors are then adapted to receive sensitive electrical components. These components are effectively shielded against any electromagnetic interference from the exterior of the articles.

Even though the backing surface 24 has some overlying paint spray on it, this does not interfere with its appearance or function. In fact, the backing may merely be used as a transitory material, serving only as a carrier for the articles to the point of paint spraying and to ulitmate assembly. At the destination point, the painted articles are removed and the backing discarded.

The invention as described utilizes in a unique manner masking developed both from the shrink coating and from the backing itself, thus reducing the number of steps and parts required in spray coating and greatly contributes to the simplicity and economy of producing an article. The article is completely masked for paint spraying while mounted on its shipping backing.

After having been paint sprayed, the article is transportable on the backing which functions both as a carrier and a masking, the plastic film material utilized for securing the articles to the backing also functions as a masking for the exterior surfaces of the articles. It is contemplated that the shrink material can also be directed not only through the openings but into selected areas so that it will produce a "wrap around" masking, this being considered as well within the scope of the present teaching of this invention.

INDUSTRIAL APPLICABILITY

The invention is used in the field of spray coating articles requiring masking of selected portions.

CONCLUSION

Although the present invention has been illustrated and described in connection with the example embodiments it should be understood that this is illustrative of the invention and by no means restrictive thereof. It is recently to be expected that those skilled in this art can make numerous revisions and adaptations of the invention and it is intended that such revisions and adaptations will be included in the scope of the following claims.

I claim:

1. A method for masking selected surfaces of a recessed nonplanar article by means of a permeable backing and a flexible plastic material used to shrink mount the article to the backing, comprising the steps of disposing a recessed portion in a surface of the article in registry with a through opening in the backing whereby edges of the recessed portion of the article follow generally the contour of the through backing opening which is proportioned so that the article edges are masked by the backing adjacent the backing opening, disposing the plastic material over the article and backing and applying heat, drawing a vacuum through the backing to cause heated flexible plastic material to wrap over and closely follow the contours of the surface of the article and to effect a bonding of the heated flexible plastic material to the backing and thereby mounting the article onto the backing, and coating the interior of the article whose exterior surfaces and the edges confronting the backing are effectively masked.

2. The method in accordance with claim 1, including the step of selectively applying vacuum in the region of a first through opening in said article to draw plastic material within the first through opening and mask edges of the first through opening during the coating step.

3. The method in accordance with claim 1, including the step of perforating the backing to facilitate the wrapping of the plastic material which covers the exterior surface of the article and wraps tightly over and follows the contours of the exterior surface.

4. The method in accordance with claim 1, including the step of applying means for shielding an interior surface of the article which remains unmasked by the plastic material that encases the exterior surface of the article and which selectively extends within a first through opening of the article to mask the periphery of the first through opening.

5. The method in accordance with claim 1, including the step of selectively applying vacuum in the region of a first through opening in the article to draw plastic material through the first through opening and into contact with an internal article projection adjacent the first through opening.

6. A shrink film package which selectively masks a recessed nonplanar article for coating of the interior of the article, comprising a permeable backing having a through backing opening therein, an article having a recessed portion in a surface and disposed in registry with the through backing opening, the backing opening following generally the contour of the recessed portion and edges of the recesse portion being masked by the backing adjacent the backing opening, a layer of pliant heat shrinkable film material overlying the article and associated surface of the backing, the film material conforming to the shape of the article and heat fusion bonded to the associated surface of the backing to secure the article to the backing, and a coating applied to the interior of the article, whereby the through backing opening provided access to the interior of the article for the coating of said interior with the edges of the article protectively masked therefrom.

7. The package in accordance with claim 6, further comprising a first through opening in the article and film material extending within the first through opening to mask edges thereof during said coating, the film material drawn into the first through opening by selectively applied vacuum in the region of the first through opening.

8. The package in accordance with claim 7, further comprising an internal article projection adjacent the first through opening and protectively masked by film material drawn by vacuum through the first through opening and into contact with the projection.

9. The package in accordance with claim 7, further comprising means for shielding applied to the interior of the article to mask an interior surface not masked by the film material extending within the first through opening.

* * * * *